Oct. 26, 1937.　　R. L. BARTON　　2,096,727
BAKING UTENSIL
Original Filed Jan. 19, 1935
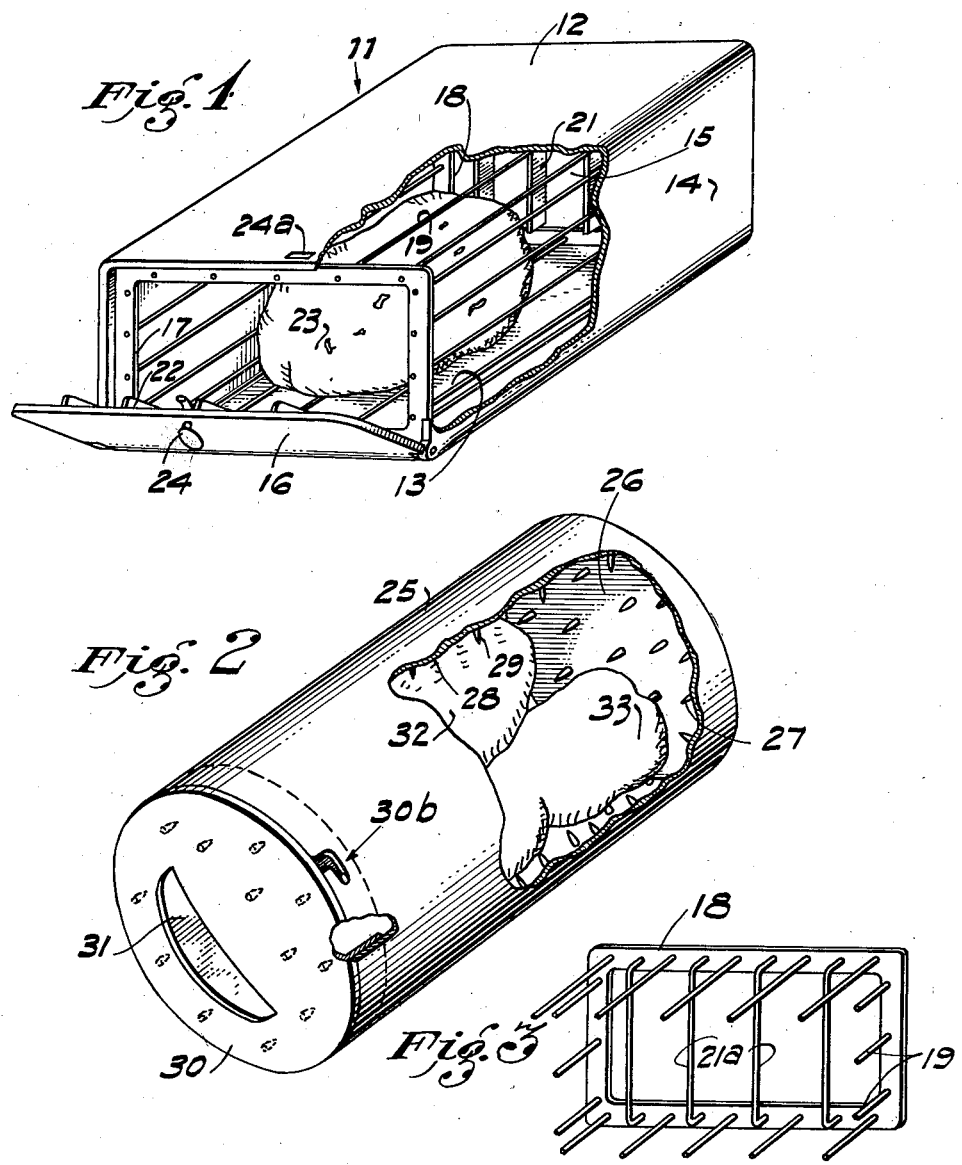

Patented Oct. 26, 1937

2,096,727

UNITED STATES PATENT OFFICE 2,096,727

BAKING UTENSIL

Raymond L. Barton, Monrovia, Calif.

Original application January 19, 1935, Serial No. 2,461. Divided and this application October 7, 1936, Serial No. 104,481

10 Claims. (Cl. 53—6)

This invention pertains to a baking or roasting utensil.

An important object of the invention is to provide in a device of the above character means for enclosing and cooking vegetables as for example Irish or sweet potatoes, nuts or food stuff such as corn on the cob whereby the same may be kept from a heated surface which might otherwise endanger scorching the article being cooked, and at the same time enabling the cooker to be submerged in a hot bed of coals or ashes, as might be had at a camp fire, or on a flame without having it contaminated with undesirable outside particles as the case would be if a potato were placed directly into the ashes, in which event it would not be so uniformly cooked.

An important object of the invention is to provide a device in which the article is supported in spaced relation to the sides of the casing being heated and is thereby kept from directly contacting with the inner surface thereof, inversion or other change in the position of said casing not affecting the effective functioning of said means.

An important object of the invention is to provide a steam-tight, single walled casing furnished with food-supporting means which, during operation, is mechanically held against displacement with relation to said casing.

Also, an important object of the invention is to provide a device which is particularly well adapted for the use of campers for baking articles in the embers of an open fire.

Yet another important object of the invention is to provide as an article of manufacture, an unbreakable two-part shell having detachable means for supporting food stuff inside thereof in spaced relation to its inner walls which is of an open character throughout.

Yet still another object of the invention is to provide in a means for steam baking an edible, means for loosely and equidistantly supporting such edible apart from the inner walls of the device in such a manner that there is afforded a slight means of contact between the edible and the supporting means whereby in any recumbent position in which the edible lies there is provided a free space for the circulation of vapor given off the edible during cooking to re-permeate it with the flavor of its own essence and also providing a vaporous substance between the edible and inside walls of the device to prevent the article being cooked from scorching or blistering adjacent the side or sides against which the heat is supplied.

Many other important objects may be accredited to the invention, but the foregoing will suffice to establish the importance and newness of such an article as a valuable culinary adjunct.

This application is a division of my co-pending application, Serial Number 2,461, filed January 19, 1935.

In the drawing containing a preferred and modified showing:

Fig. 1 is a perspective view of the device with parts of the casing broken away to disclose the interior construction.

Fig. 2 is a perspective view of a cylindrical oven, parts of the oven wall being broken away to show interior parts showing a modification.

Fig. 3 shows a fragmentary portion of the wire cage illustrating a modified manner of constructing the inner end portion of the device.

Referring in detail to the drawing, and describing first the structure shown in Fig. 1, the oven casing or shell 11 is shown as being rectangular in cross section. Said casing has a top wall 12, bottom wall 13, side walls 14 and a rear end wall 15. The front end of the casing has hinged thereto a conventional door 16. In a countersunk relation to the front end of the casing there is mounted therewithin a detachable wire cage comprising a rectangular sheet metal frame member 17, a like rear frame member 18 being located adjacent to the rear end wall 15 of the oven. These frame members 17 and 18 afford means whereby a series of spacer rods 19 are mounted in a parallel spaced relation to the top, bottom and sides of the oven. Said rods have their end portions inserted into said frame members near the inside edges of the latter, the rods thus being supported in such positions as to keep articles being cooked within the oven from coming into contact with either the top, bottom or side walls thereof.

Means are also provided to keep the contents of the oven out of contact with the rear end wall 15 and also from directly engaging the inner surface of the oven door. Said means may consist of the parallel rear fins 21, which are secured in an edgewise manner to the rear wall 15 of the oven, and the parallel front fins 22, attached in an edgewise manner to the inner side of said door. From the foregoing description of fins, rods, and rectangular open frame it will be seen that these elements combine to keep any article, for example a potato 23, within the oven out of direct contact with the entire inner surface thereof, thus insuring that such article will be baked uniformly without having any part of its surface burned or blistered. At the front end of the top wall of the casing a locking aperture 24a cooperates with a handle operated door locking element 24.

In Fig. 2 is shown a cylindrical oven casing 25 which is also furnished interiorly with means to keep potatoes and other articles out of contact with the oven's walls during baking. In this embodiment of the invention the rear oven wall 26 is furnished with a multiplicity of spurs 27 and the side wall 28 of this oven is likewise furnished with spurs 29. The front end of the oven shown in Fig. 2 is provided with a turnable door 30 with spurs on its inside wall and a sight opening 31 protected desirably by isinglass. There is a bayonet joint locking device 30b for said door. In this oven an upper potato 32 and lower potato 33 are shown, these potatoes being impaled upon the spurs which, however, only if at all slightly penetrate the sides of the potatoes, hence keep them out of direct contact with the walls of the oven, therefore functioning in a manner similar to that of the spacing rods of Fig. 1.

In using all the different embodiments of the invention the oven may be inverted after the baking has been partially completed thus insuring a more uniform cooking of the potatoes or other food being baked.

In all the embodiments of the invention portable oven casings are shown intended to be made of materials which will withstand baking temperatures.

In using the device shown in Fig. 1, the cage is first detached and filled with the number and size of potatoes required for the meal. The fact that the cage is open on all sides enables the cook to properly arrange the number and size so as to utilize all available space when necessary. The cage is then projected into the casing whence it is then placed over a slow fire. A device of this character is a gas saver and on hot days when heating an oven would be undesirable the want of a properly baked potato is not lacking when the device in question makes a preferred substitute. A potato thus baked permits the removal of the outer skin and such of the meat and vitaminous food adjacent thereto is thus preserved.

In the modified cage structure shown in Fig. 3, the rear frame member 18 is provided with a plurality of spacing wires 21a which space the potato from the end wall of the casing 15. This construction supplants the use of fins 21, keeps potatoes from dropping thru the end of the cage while the latter is being detached, makes the inner end of casing easier to clean and simplifies the construction at that end in general.

The constructions described come within the scope of the claims whether fins project thru the end of the frame or wires are provided on the frame to space the potatoes the same distance from the inner end wall.

I claim:

1. In a device of the kind described, a portable elongated casing having longitudinally extending rods in spaced relation to its top, bottom and sides, and having fins mounted in its end portions, thereby to prevent articles being baked therein from contacting directly with any part of its interior surface.

2. In a device of the kind described, a portable elongated casing having longitudinally extending rods in spaced relation to its top, bottom and sides, and means independent of said rods mounted in the end portions of said casing and cooperating with said rods to prevent food stuff being baked therein from contacting directly with any part of its interior surface.

3. In a device of the kind described, a portable elongated casing having in each end a frame of relatively narrow sheet material edgewisely supported by the side walls of said casing, a plurality of rods mounted in spaced relation to the inner surface of said casing and extending longitudinally thereof, said rods having their end portions fastened to said frames, and means mounted in the end portions of said casing and cooperating with said rods to space articles being baked therein apart from its interior surface.

4. In a device of the kind described; a portable elongated casing having in each end a frame of relatively narrow sheet material; at least one end of which is open for filling purposes, edgewisely supported by the side walls of said casing; a plurality of rods having their end portions fastened in said frames in spaced relation to the inner surface of said casing and extending longitudinally thereof; and means mounted in the end portion of said casing that is adjacent the open end of said end frame and cooperating with said rods to space food stuff apart from that end of said casing.

5. In a device of the kind described, an elongated casing having longitudinally extending rods in spaced relation to its top, bottom and sides, and having a plurality of inwardly directed spacing elements fastened to its end portions, said rods and spacing elements spacing food stuff from the walls of the casing thereby to prevent articles being baked therein from contacting directly with any part of its interior surface.

6. A casing for singly baking potatoes in an open fire and submergible in the embers thereof wherein the vapor given off by the potato after heating is utilized in the cooking thereof as well as preventing burning, and means to provide a free space on all sides of the potato whereby to keep all surface portions of said potato from direct contact with the interior walls of the casing between it and the fire, said means being of an open character and supported by all the walls of said casing.

7. In a device of the kind described, a portable elongated open ended casing comprising side and end walls, a door for closing the open end of said casing, means spacing food stuff apart from said side walls, and a plurality of inwardly directed spacing elements mounted in said end wall and said door and cooperating with the side wall spacing means to prevent articles being baked in said casing from contacting directly with any part of its interior surface.

8. A device of the kind described comprising an open ended single walled casing, a door for closing the open end of said casing, and spacing means lining substantially the entire surface of said casing including said door to keep articles being baked therein from direct contact with said surface.

9. A device of the kind described, a single walled casing submergible in the embers of a fire comprising side and end walls and one of said end walls being open, a door for closing the open end of said casing, spacing means supported by said side and closed end walls spacing food stuff apart from the interior surface of the latter walls, and additional spacing means mounted on said door to space said food stuff apart from the interior surface thereof.

10. A device of the kind described comprising an open ended portable elongated single walled casing; a cage, having an open end, comprising spaced end frames of relatively narrow sheet material; rods having their end portions fastened to said frames in spaced relation to the inner surface of said casing and extending longitudinally thereof projectible into the open end of said casing; and a door for closing the open end of said casing; said casing having means for spacing food apart from its end wall and door in order to complete the spacing from the entire inner surface thereof of article being baked therein.

RAYMOND L. BARTON.